Dec. 15, 1936.  J. EGGERT ET AL  2,064,058
LENTICULAR STENCIL FILM
Filed March 17, 1934  4 Sheets-Sheet 1
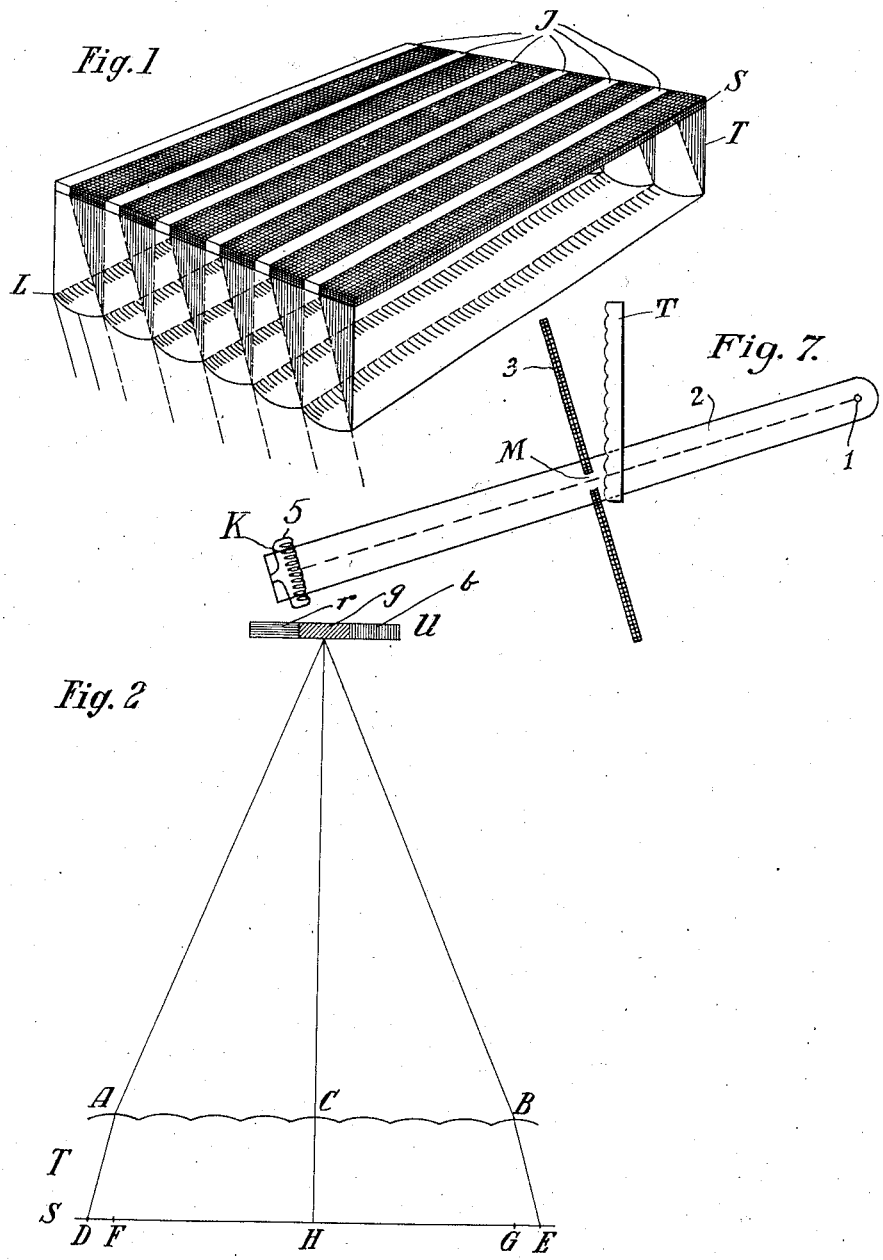

Dec. 15, 1936.    J. EGGERT ET AL    2,064,058
LENTICULAR STENCIL FILM
Filed March 17, 1934    4 Sheets-Sheet 2
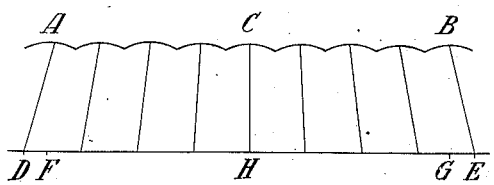
Fig. 3a
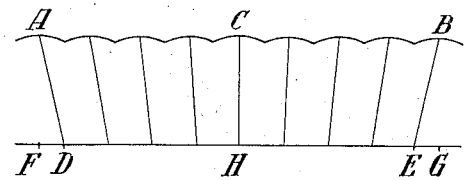
Fig. 3b
Fig. 3c
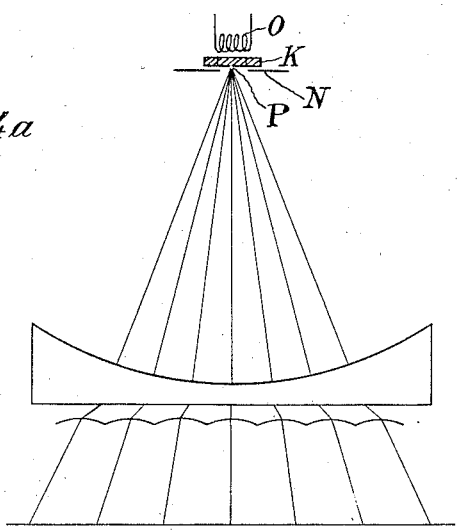
Fig. 4a Dec. 15, 1936.   J. EGGERT ET AL   2,064,058
LENTICULAR STENCIL FILM
Filed March 17, 1934   4 Sheets-Sheet 3
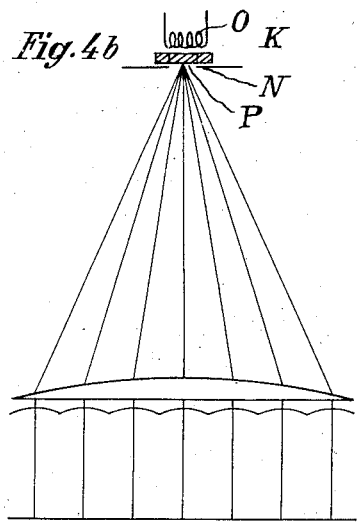
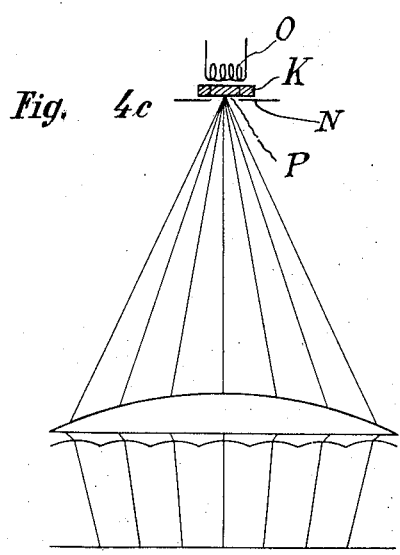
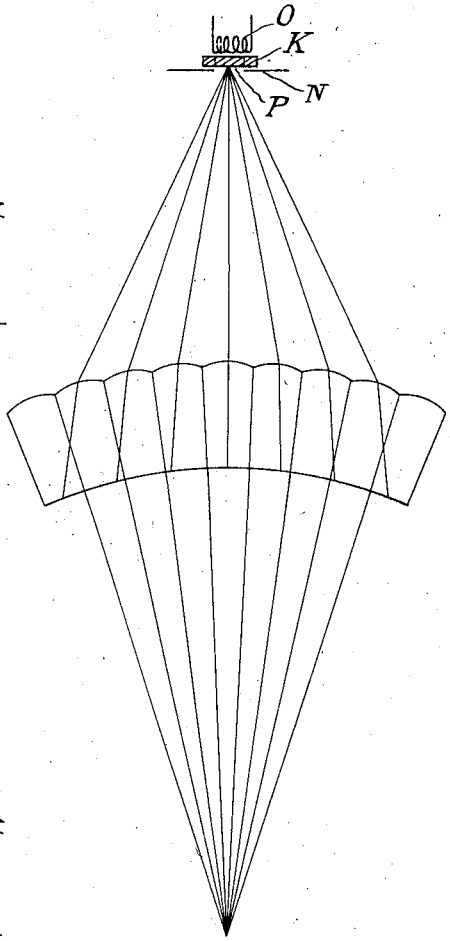
Inventors:
John Eggert
Gerd Heymer
By Potter, Pierce & Scheffler,
Attorneys.

Dec. 15, 1936.  J. EGGERT ET AL  2,064,058
LENTICULAR STENCIL FILM
Filed March 17, 1934    4 Sheets-Sheet 4
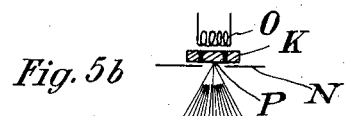
Fig. 5b
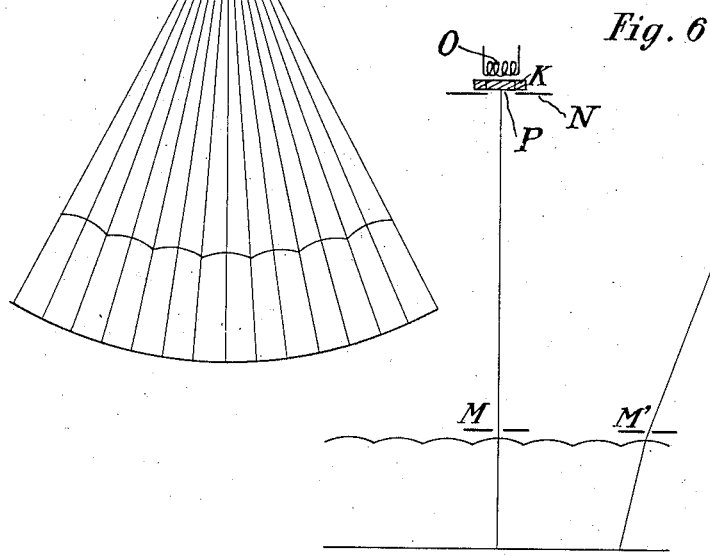
Fig. 6
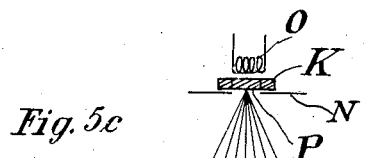
Fig. 5c
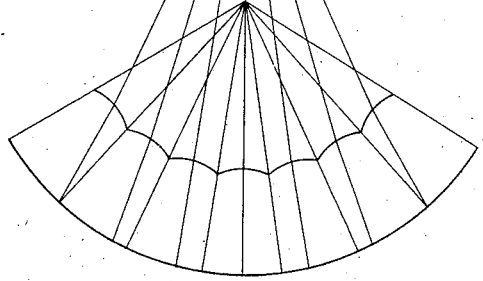
Inventors:
John Eggert,
Gud Heymer,
By Potter, Pierce & Scheffler,
Attorneys.

Patented Dec. 15, 1936

2,064,058

UNITED STATES PATENT OFFICE 2,064,058

LENTICULAR STENCIL FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application March 17, 1934, Serial No. 716,138 In Germany March 18, 1933

7 Claims. (Cl. 88—16.4)

Our present invention relates to the manufacture of lenticular stencil film.

One of its objects is an improved process for the manufacture of lenticular stencil film. Further objects will be seen from the detailed specification following hereafter.

Reference is made to the accompanying drawings in which:

Fig. 1 illustrates a stencil film,

Fig. 2 shows the position which the transparent strips of the stencil film may possibly occupy, Figs. 3a, 3b and 3c show the three main positions which the middle of the green pictures may occupy with relation to the main axis of the lenticular elements, Figs. 4a, 4b and 4c illustrate the production of the displacement shown in Figs. 3a, 3b and 3c by means of lenses, Figs. 5a, 5b and 5c illustrate the production of the displacement shown in Figs. 3a, 3b and 3c by means of bending the film, and Figs. 6 and 7 illustrate the production of the displacement shown in Figs. 3a, 3b and 3c by means of a source of light and a slotted diaphragm moved at different velocities.

In the co-pending application Ser. No. 667,925 filed April 25, 1933 by Gerd Heymer, one of the inventors of the present invention the manufacture of lenticular stencil film has been described. In this process it is necessary to produce first an intermediate film.

According to this invention a lenticular "stencil film" is obtained in a simple manner with a single exposure by exposing the lenticular film through the lenticular elements with interposition of a diaphragm having apertures which in number and position correspond with the number and the position of the filter planes of a multi-color filter such as is customary in taking pictures on lenticular films, the optical or, if there are no refracting parts between the film and the diaphragm, the real position of the diaphragm apertures with relation to the lenticular film being selected in such a manner that the exposed areas occupy a position with respect to the main axis of the lenticular elements which varies from element to element so as to be characteristic for a partial color picture. The alteration of the optical or the real position of the diaphragm apertures may be achieved in various manners. For instance, there may be placed before the lenticular film a convex or a concave cylindrical lens, the axis of which extends parallel to the lenticular elements. Furthermore the lenticular film may be curved convexly or concavely to the diaphragm about an axis that extends parallel to the lenticular embossing. Another expedient is to move a source of light and a slot arranged above the film, in the same direction, but at different speeds, so that the direction of incidence of the light is continuously altered.

The process of the invention is now more fully explained with reference to the accompanying drawings:

Fig. 1 represents a "stencil film" which consists of the support T, having a system of lenticular embossing L, and the light-sensitive layer S which is blackened except for the transparent areas J. These areas occupy a determined position relative to the lenticular elements L which in each particular case is characteristic for the direction of the light which emanates from the lenses L, when the "stencil film" is illuminated through its sensitive layer.

Fig. 2 shows the position which the transparent areas may possibly occupy with respect to the main axis of the lenticular elements. $T^5$ is the lenticular film, U is a filter comprising the color areas red $(r)$, green $(g)$ and blue $(b)$, such as it is used for reproducing lenticular films and may be equal to or different from the exposure filter as to distance from the film and breadth. This filter is now exchanged for a diaphragm having an aperture which in size corresponds with the size of the multi-color filter and of which areas can be masked that correspond with the color strips of the filter. If, for instance, of the diaphragm aperture the areas corresponding with the color strips red and blue are masked, so that only the light transmitted by the medium strip is projected on the film, this strip will be reproduced under each lenticular element, and if the dimensions of the filter U and of the lenticular film are such that the total breadth of the reproduction of the color areas $r$, $g$ and $b$ under each of the lenticular elements occupies the breadth of one lenticular embossing, there will be produced, when the light passes through the aperture $g$, under each lenticular element a bright strip which occupies only one third of the whole breadth of the lenticular element. Characteristic for such films is the position of these bright strips with relation to the main axis of each of the minute lenticular elements. In Fig. 2 it is shown that on the left side of the picture the reproduction of the middle D of the area $g$ of the diaphragm through the lenticular element A is displaced by a certain amount towards the margin away from the point of intersection F of the main axis of this lenticular element with the layer S. This amount depends on the position of the filter with relation to the film. The same applies to the projection E through the lenticular element B, E being likewise displaced towards the margin away from the point of intersection G of the main axis of the lenticulation B with the light-sensitive layer S. In the middle of the picture field the center of the green filter strip or the corresponding aperture of the diaphragm respectively is projected at H by the lenticular element C.

A "stencil film" may have any possible position of the points D and E with respect to the main axis of their coordinate lenticular elements, the position depending as aforesaid on the position of the multi-color filter with relation to the film in projection. However, there must be taken account of the fact that the middles of the green picture strips behind each lenticular element must by the same amount lie on the other side of the main axis of corresponding lenticular elements than do those of the film to be projected, that is to say the print produced by means of the "stencil film" from the original. If, for instance, the arrangement shown in Fig. 2 is that intended for use in projection, the points D and E must in the "stencil film" lie on the other side of F and G at the distance FD and GE respectively. The same holds true with regard to the remaining lenticular elements. Therefore, the transparent strip behind each lenticular element of the "stencil film" is a mirror image.

Figs. 3a, 3b and 3c represent the three main positions which the middle of the green pictures may occupy with relation to the main axis of the lenticular elements. Fig. 3a shows the increasing displacement of the middle of the green picture towards the margin. Fig. 3b shows the coincidence of the middle of the green pictures with the main axes of the lenticular elements and Fig. 3c shows the increasing displacement of the middle of the pictures towards the middle of the film.

Referring to Figs. 4a, 4b and 4c the displacement of the middle of the green pictures illustrated in Figs. 3a, 3b and 3c is produced by lenses which are arranged between the source of light and the film, and the focal length of which is so chosen that the rays AD, BE (see Figs. 3a, 3b, 3c) and all of the rays lying between these marginal rays show the desired inclination towards the main axes of the corresponding lenticular elements. In Fig. 4a the arrangement of a concave cylindrical lens in front of the lenticular elements facing the source of light causes an increasing displacement of the middle of the green pictures towards the margin. The source of light consists of translucent pane K which is illuminated, for instance, by an incandescent lamp O. The source of light is masked towards the film by the diaphragm N having an aperture P of a breadth equal to that of one strip of the projection filter. In Fig. 4b any inclination of the rays is avoided by adoption of a cylindrical lens of a feebly convex form so that the rays coincide with the main axes of the lenticular elements, that is to say, the middles of the green pictures lie axially behind the middle of each lenticular element. By the use of a lens with a higher degree of convexity, as represented in Fig. 4c, the middles of the green pictures are displaced towards the middle of the film.

Referring to Figs. 5a, 5b and 5c, the inclination of the rays is altered by bending the film cylindrically, for instance, by passing it through a bent picture gate about an axis which extends parallel to the lenticular elements. For producing a more considerable displacement towards the margins, the film is curved so that its convex side faces the source of light. If the middles of the green pictures are to coincide with the main axes of the lenticular elements the film is bent to a feebly concave form, in such a manner that the center of curvature lies within the source of light, as represented in Fig. 5b. If the picture points are to be displaced towards the middle, the concavity of the curvature of the film is increased, so that the center of curvature comes to lie between the source of light and the film, as represented in Fig. 5c. The source of light is the same as that of Figs. 4a, b and c.

According to a further modification, the displacement of the middle of the green pictures may be produced by moving a source of light and determining the direction, in which the rays are to be projected on each lenticular element by a slot travelling over the film. If the green middle rays in taking the original or projecting the print diverge before arriving on the film, the speed of the source of light in producing the "stencil film" is greater than that of the slot. Corresponding considerations apply to the other cases.

Referring to Fig. 6, O is again a source of light illuminating the translucent pane K which makes the light diffuse and is limited in its extension perpendicularly to the lenticular elements by the diaphragm N having an aperture P of the breadth of a strip of the projection filter. M represents a slit-shaped diaphragm; both are moved at different speeds from the middle towards the margins of the pictures in a path parallel to the film plane. If the source of light occupies the position O', the translucent pane K, the position K', the diaphragm N, the position N' and the slit-shaped diaphragm occupies the position M', the source of light has been moved at a higher speed than that of the diaphragm so that the middles of the green pictures are displaced towards the middle. If, on the contrary, the speed of the source of light is inferior to that of the slot, the middles of the green pictures are displaced towards the margins. The movement of the source of light and of the slot must always be such that in the middle of the picture field, the source of light and the slot coincide with the main axis of the medium lenticular element.

Fig. 7 shows an arrangement for printing according to the modification of printing as shown in Fig. 6. The source of light K consists of an incandescent wire coil 5 of the breadth of a color strip of the projection filter. M is the slot of the diaphragm arranged near the lenticular film as in Fig. 6. The pivot 1 occupies with respect to the lenticular film the same position as the center U in Fig. 2. The lever 2 is rotatable about the pivot 1 and carries the diaphragm 3 with the aperture M arranged near the film T which is not laterally displaced. The lever 2 carries furthermore the source of light 5 mounted at a distance from the film corresponding with that of the projection filter from the film in reproduction. If the lever 2 is turned about the pivot 1, the slot M and the source of light are displaced in the required manner so that the incidence of the light rays on the film is changed from the one margin of the film to the other in the required manner The process according to the invention, however, also allows of combinations of the modifications set forth in the present description. Thus, for instance, for displacing the picture points towards the middle of the film, there may simultaneously be applied a convex lens, a concave curvature of the film and a movement of the source of light and of a slot.

The modifications described with reference to the accompanying drawings, only refer to the manufacture of a "stencil film" for the green filter area. The manufacture of the "stencil films" for the red and the blue filter strips is effected in a corresponding manner, with the difference that the diaphragm aperture is masked so as to leave unmasked the area corresponding with the blue or the red filter strip.

From the foregoing description it will be seen that for the production of the blackened and transparent strips behind each lenticular element of the stencil film there are two possibilities. According to one modification the areas of the diaphragm aperture corresponding with two filter strips of the projection filter are masked and the emulsion layer after having been exposed subject to the above conditions is developed according to the reversal process. In this case the transparent area behind each lenticular element of the stencil film corresponds with the unmasked area of the diaphragm and the stencil film is adapted for printing part color pictures corresponding with the color of the filter strip with which corresponds the unmasked area of the diaphragm. According to the other modification there is only masked the area of the diaphragm corresponding with the color strip of the projection filter having the color of the part-color pictures which shall be printed with the produced stencil film. In this case the exposed lenticular film is developed to a negative so that the unexposed strip of the film behind each lenticular element remains transparent.

The term "filter to be used in printing without the application of a stencil film" is intended to mean the corresponding projection filter used in projecting the print when printing a lenticular film on another lenticular film or when printing partial color pictures on a lenticular film, or is intended to mean the corresponding exposure filter when printing partial color pictures from a lenticular film on smooth film.

What we claim is:

1. The process of making a lenticular stencil film for use in printing with a lenticular film which comprises providing a source of light having a size and shape geometrically similar to the effective aperture of the multi-color filter coordinated to said lenticular film and arranged on the side of the lenticular elements at a distance from a light sensitive lenticular film to subtend the same angle as said multi-color filter subtends on said coordinated lenticular film, masking said source of light to correspond with at least one of the color components of said filter, directing the light from said unmasked portion onto said sensitive lenticular film to provide in the sensitive emulsion exposed strips behind the lenticular elements which provide a mirror image behind each lenticular element of the unmasked light geometrically like the record of the corresponding components of the color filter recorded in said lenticular film which is to be printed, and developing said exposed lenticular film.

2. The process of making a lenticular stencil film for use in printing with a lenticular film which comprises providing a source of light having a size and shape geometrically similar to the effective aperture of the multi-color filter coordinated to said lenticular film and arranged on the side of the lenticular elements at a distance from a light sensitive lenticular film to subtend the same angle as said multi-color filter subtends on said coordinated lenticular film, masking said source of light to correspond with one of the color components of said filter, directing the light from said unmasked portion onto said sensitive lenticular film to provide in the sensitive emulsion exposed strips, behind the lenticular elements which provide a mirror image behind each lenticular element of the unmasked light geometrically like the record of the corresponding component of the color filter recorded in said lenticular film which is to be printed, and developing said exposed lenticular film to a positive.

3. The process of making a lenticular stencil film for use in printing with a lenticular film which comprises providing a source of light having a size and shape geometrically similar to the effective aperture of the multi-color filter coordinated to said lenticular film and arranged on the side of the lenticular elements at a distance from a light sensitive lenticular film to subtend the same angle as said multi-color filter subtends on said coordinated lenticular film, masking said source of light to correspond with two of the color components of said filter, directing the light from said unmasked portion onto said sensitive lenticular film to provide in the sensitive emulsion exposed strips behind the lenticular elements which provide a mirror image behind each lenticular element of the unmasked light geometrically like the record of the corresponding components of the color filter recorded in said lenticular film which is to be printed, and developing said exposed lenticular film to a negative.

4. In combination, a light sensitive lenticular film for use in printing with a lenticular film, in front of said light sensitive lenticular film a source of light having a size and shape geometrically similar to the effective aperture of the multi-color filter coordinated to said lenticular film which is used for printing and arranged on the side of the lenticular elements at a distance from said light sensitive lenticular film to subtend the same angle as said multi-color filter subtends on said coordinated lenticular film, means for masking said source of light to correspond with at least one of the color components of said filter, and means for directing the light from said unmasked portion onto said sensitive lenticular film to provide in the sensitive emulsion exposed strips behind the lenticular elements which provide a mirror image behind each lenticular element of the unmasked light geometrically like the record of the corresponding components of the color filter recorded in said lenticular film which is to be printed.

5. In combination, a light sensitive lenticular film for use in printing with a lenticular film, in front of said light sensitive lenticular film a source of light having a size and shape geometrically similar to the effective aperture of the multi-color filter coordinated to said lenticular film which is used for printing and arranged on the side of the lenticular elements at a distance from said light sensitive lenticular film to subtend the same angle as said multi-color filter subtends on said coordinated lenticular film, means for masking said source of light to correspond with at least one of the color components of said filter, and a cylindrical lens arranged between said source of light and said film directing the light from said unmasked portion onto said sensitive lenticular film to provide in the sensitive emulsion exposed strips behind the lenticular elements which provide a mirror image behind each lenticular element of the unmasked light geometrically like the record of the corresponding components of the color filter recorded in said lenticular film which is to be printed.

6. In combination, a light sensitive lenticular film for use in printing with a lenticular film, in front of said light sensitive lenticular film a source of light having a size and shape geometrically similar to the effective aperture of the multi-color filter coordinated to said lenticular film which is used for printing and arranged on the side of the lenticular elements at a distance from said light sensitive lenticular film to subtend the same angle as said multi-color filter subtends on said coordinated lenticular film, means for masking said source of light to correspond with at least one of the color components of said filter, and means for bending said film to a cylindrical plane for directing the light from said unmasked portion onto said sensitive lenticular film to provide in the sensitive emulsion exposed strips behind the lenticular elements which provide a mirror image behind each lenticular element of the unmasked light geometrically like the record of the corresponding components of the color filter recorded in said lenticular film which is to be printed 7. In combination, a light sensitive lenticular film for use in printing with a lenticular film, in front of said light sensitive lenticular film a source of light having a size and shape geometrically similar to the effective aperture of the multi-color filter coordinated to said lenticular film which is used for printing and arranged on the side of the lenticular elements at a distance from said light sensitive lenticular film to subtend the same angle as said multi-color filter subtends on said coordinated lenticular film, means for masking said source of light to correspond with at least one of the color components of said filter, a diaphragm having a slot arranged between said source of light and said light sensitive lenticular film, and means for moving said diaphragm and said source of light with different velocities to direct the light from said unmasked portion onto said sensitive lenticular film to provide in the sensitive emulsion exposed strips behind the lenticular elements which provide a mirror image behind each lenticular element of the unmasked light geometrically like the record of the corresponding components of the color filter recorded in said lenticular film which is to be printed.

JOHN EGGERT.
GERD HEYMER.